(12) United States Patent
Lin et al.

(10) Patent No.: US 7,457,409 B2
(45) Date of Patent: Nov. 25, 2008

(54) SYSTEM AND METHOD FOR PERFORMING SECURE COMMUNICATIONS IN A WIRELESS LOCAL AREA NETWORK

(75) Inventors: Chu-Ming Lin, Hsinchu (TW); Ko-Ming Chan, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 882 days.

(21) Appl. No.: 10/864,837

(22) Filed: Jun. 9, 2004

(65) Prior Publication Data

US 2005/0278548 A1    Dec. 15, 2005

(51) Int. Cl.
*H04L 9/28* (2006.01)
(52) U.S. Cl. ........................................ 380/37
(58) Field of Classification Search ................ 713/151, 713/153, 168; 380/270, 37; 709/230, 236
See application file for complete search history.

(56) References Cited

U.S. PATENT DOCUMENTS

2004/0059825 A1* 3/2004 Edwards et al. ............. 709/230
2004/0146158 A1* 7/2004 Park ............................ 380/37

OTHER PUBLICATIONS

Joon Hyoung Shim, Taek Won Kwon, Dae Won Kim, Jung Hee Suk, Young Hwan Choi, and Jun rim Choi; Compatible Design of CCMP and OCB AES Cipher for Wireless LAN Security; Sep. 17-20, 2003; SOC Conference, 2003. Proceedings. IEEE International (Systems-on-Chip). pp. 275-276.*

* cited by examiner

*Primary Examiner*—Gilberto Barron, Jr.
*Assistant Examiner*—Martin Jeriko P San Juan
(74) *Attorney, Agent, or Firm*—Thomas, Kayden, Horstemeyer & Risley

(57) ABSTRACT

A scheme for performing secure communications in a wireless local network. In one aspect of the invention, software hosted on a host processing unit maintains multiple queues. A networking module adapted to communicate with the host processing unit includes corresponding FIFO buffers to service the queues. The networking module also comprises an arbiter and a security engine. The arbiter is responsible for determining which queue is to be serviced next contingent upon a priority scheme. The security engine preferably incorporates a cipher performing encryption and decryption in a sequential or chain mode. Once one of the queues is granted by the arbiter, the security engine fetches data from the granted queue and then encrypts or decrypts the data using the cipher.

20 Claims, 3 Drawing Sheets

SYSTEM AND METHOD FOR PERFORMING SECURE COMMUNICATIONS IN A WIRELESS LOCAL AREA NETWORK

BACKGROUND

1. Field of the Invention

The invention relates to communication systems, and more particularly to a scheme for performing secure communications in a wireless local area network.

2. Description of the Related Art

A wireless local area network (WLAN) is a flexible data communications system that can either replace or extend a wired LAN to provide added functionality. Using radio frequency (RF) technology, WLANs transmit and receive data over the air, through walls, ceilings and even cement structures, without wired cabling. A WLAN provides all the features and benefits of traditional LAN technologies like Ethernet and Token Ring, but without the limitations of being tethered to a cable. This provides greatly increased freedom and flexibility.

The most common WLANs currently are those conforming to the IEEE 802.11 standard family. Not only are they increasingly deployed in private enterprise applications, but also in public applications such as airports and coffee shops. Since WLAN was designed as a wireless extension of the Ethernet for indoor use, it has adopted a simple protocol known as wired equivalent privacy (WEP) for authentication and encryption. According to WEP, every WLAN station and every access point in a Basic Service Set share a common, static key, called a WEP key. It has either 40 bits (standard) or 128 bits (optional). The authentication process is either an open authentication based on some advanced authentication method or a challenge and response authentication based on the WEP key. The encryption algorithm is RC4 with the key sequence generated by the WEP key and a random vector. However, the security flaws of WEP have been highly publicized, mainly due to the implementation flaw of the key scheduling algorithm in the RC4 encryption algorithm and the use of a static WEP key shared by every entity.

To address the security flaws related to WEP, the IEEE 802.1x standard has been introduced and the IEEE 802.11i standard is currently under development. Using the IEEE 802.1x standard along with various EAPs, or Extensible Authentication Protocols, WLAN authentication can be managed from a centralized server such as a RADIUS server, by means of session-specific keys for encryption purposes. Security flaws in the RC4 algorithm in WEP can be alleviated to some extent if the session-specific key is changed frequently. According to the IEEE 802.11i standard draft, the Advanced Encryption Standard (AES) will become the ultimate encryption algorithm to protect over-the-air traffic.

The cryptographic functions, however, are some of the most CPU-hungry algorithms to conventional security designs targeted at software. It would be desirable to off-load the cryptographic functions from the CPU. Furthermore, the load generated by security operations often consumes most of the system bus bandwidth so conventional WLAN equipment poses performance problems. Therefore, what is needed is a scheme for performing secure communications in a WLAN, achieving overall system cost effectiveness

SUMMARY

The present invention is generally directed to a scheme for performing secure communications in a wireless local area network. According to one aspect of the invention, a method for performing secure communications is disclosed. The network includes at least a computer that comprises a host processing unit and a networking module incorporating a security engine. The method of the invention is outlined as follows. To begin with, software hosted on the host processing unit maintains a transmitter queue and security queue. Also, the software partitions a data unit to be transmitted into N number of sub-blocks, each sub-block having the same block size as a cipher involved in the security engine, and stores the N data sub-blocks in the security queue. Then the software invokes an encryption function that takes the N data sub-blocks as a parameter. In response to the invoked encryption function, the security engine fetches the N data sub-blocks from the security queue in accordance with the parameter of the encryption function. After that, the security engine generates a cryptographic checksum through the cipher by performing encryption on the N data sub-blocks. The security engine subsequently returns the cryptographic checksum to the software by which this code is appended to the N data sub-blocks. The software also stores the N data sub-blocks and the appended cryptographic checksum in the transmitter queue and invokes the encryption function that takes the N data sub-blocks including the appended cryptographic checksum as the parameter. In response to the invoked encryption function, the security engine now fetches the N data sub-blocks and the appended cryptographic checksum from the transmitter queue in accordance with the parameter of the encryption function. Then the security engine generates a protected data unit through the cipher by performing encryption on the N data sub-blocks including the appended cryptographic checksum. Consequently, the protected data unit is delivered for transmission on a physical medium.

According to another aspect of the invention, a method for performing secure communications is set forth as follows. First, software hosted on the host processing unit maintains a receiver queue and security queue. In response to receipt of N encrypted data sub-blocks, each having the same block size as the cipher, and an encrypted cryptographic checksum appended thereto, the security engine recovers N data sub-blocks including a cryptographic checksum through the cipher by performing decryption on the N encrypted data sub-blocks and the encrypted cryptographic checksum appended thereto. After that, the N data sub-blocks including the cryptographic checksum are transferred to the receiver queue. Meanwhile, the software stores the N data sub-blocks in the security queue and invokes an encryption function that takes the N data sub-blocks as a parameter. In response to the invoked encryption function, the security engine fetches the N data sub-blocks from the security queue in accordance with the parameter of the encryption function. Next, the security engine generates a recomputed result through the cipher by performing encryption on the N data sub-blocks. The recomputed result is then returned to the software by which it is compared with the cryptographic checksum. If the cryptographic checksum matches the recomputed result, the software restores the N data sub-blocks into a whole data unit.

According to yet another aspect of the invention, an apparatus for performing secure communications in a wireless local area network is provided. The apparatus of the invention comprises a host processing unit on which software is hosted. Preferably, the software maintains at least a transmitter queue and security queue, and partitions a data unit to be transmitted into N number of data sub-blocks each having the same block size as a cipher. The apparatus of the invention also comprises a networking module adapted to communicate with the host processing unit via a peripheral bus. The networking module comprises an arbiter, a security engine, a security FIFO buffer, and a transmit FIFO buffer. The arbiter determines which queue is to be serviced next contingent upon a priority scheme. The cipher is incorporated in the security engine. When the security queue is granted service by the arbiter, the security engine fetches N data sub-blocks therefrom and then generates a cryptographic checksum through the cipher by performing encryption on the N data sub-blocks. The security FIFO buffer is configured to store the cryptographic checksum. In this manner, the cryptographic checksum is returned to the software. When the transmit queue is granted service by the arbiter, the security engine fetches therefrom the N data sub-blocks along with the cryptographic checksum appended thereto and then generates a protected data unit through the cipher by performing encryption on the N data sub-blocks including the appended cryptographic checksum. The transmit FIFO buffer is configured to store the protected data unit for transmission.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

With reference to the accompanying figures, exemplary embodiments of the invention will now be described. The exemplary embodiments are described primarily with reference to block diagrams and flowcharts. As to the flowcharts, each block therein represents both a method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described comprehensively.

Figure 1:
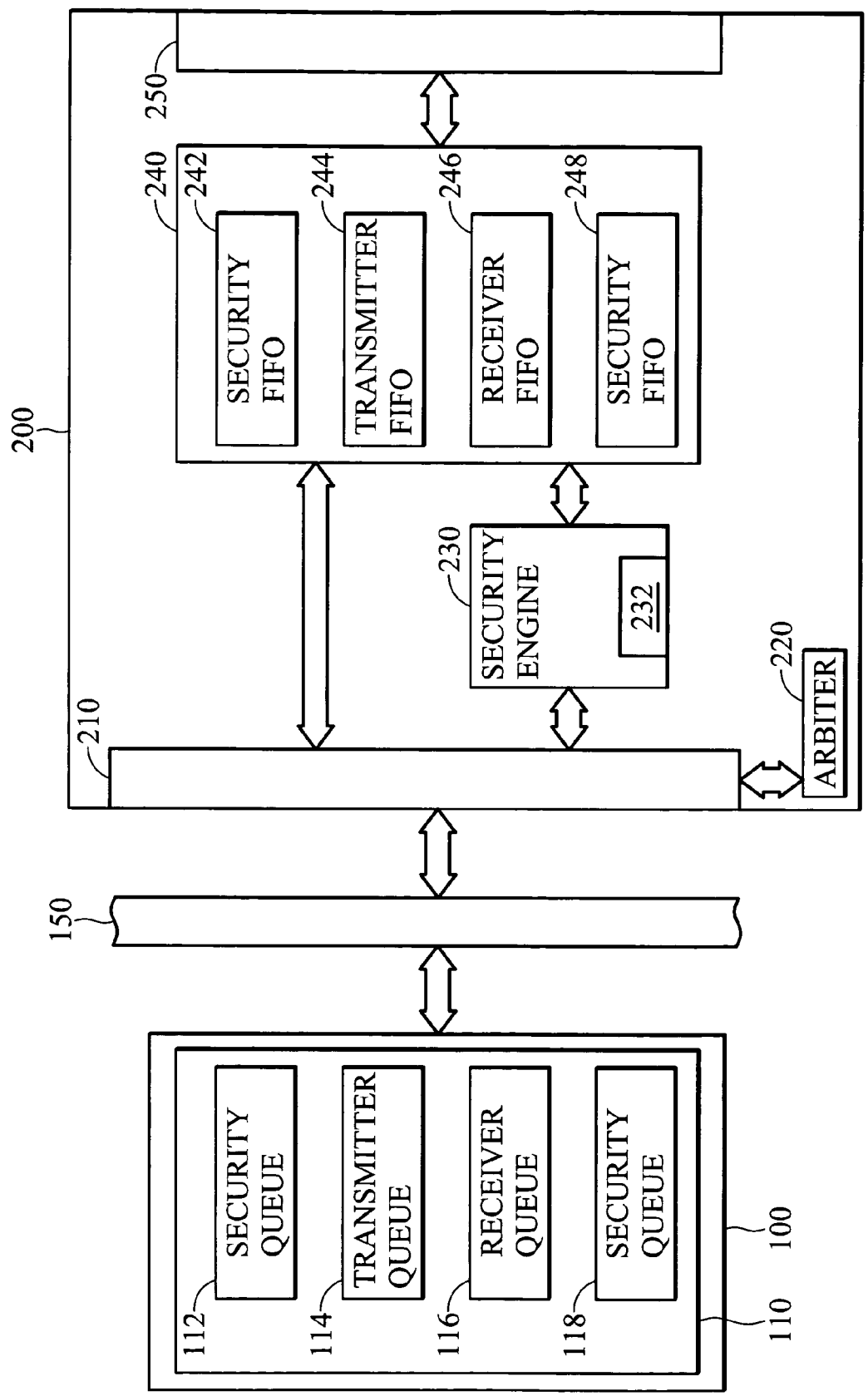
FIG. 1 is a block diagram of a system for performing secure communications in a WLAN according to an embodiment of the invention.

FIG. 1 is a block diagram illustrating an embodiment of a system for performing secure communications in a WLAN according to the present invention. The system of the invention comprises a host processing unit 100 on which software 110 is hosted. The software 110 maintains, but is not limited to, a transmitter queue 114, a receiver queue 116, and two security queues 112 and 118 (one for transmitting and another for receiving). Although four queues are shown in FIG. 1, a particular host processing unit may contain any number of queues. The apparatus of the invention also comprises a networking module 200 adapted to communicate with the host processing unit 100 via a peripheral bus 150. The networking module 200 enables the host processing unit 100 to transmit and receive data over a physical medium. The physical medium may be any one of several media suitable for data transmission according to a communication protocol, including, for example, coaxial cabling, twisted pair lines, optical fiber cabling, or a wireless medium. The peripheral bus 150 may be a peripheral component interconnect (PCI) bus or universal serial bus (USB). However, these are merely examples of the bus 150 and embodiments of the present invention are not limited in this respect. As depicted, the networking module 200 includes logic 210 to interface with the peripheral bus 150. In one embodiment, the networking module 200 comprises an arbiter 220, a security engine 230, and multiple FIFO buffers 240. These FIFO buffers 240 are employed to service the queues 112-118, respectively, which include a transmitter FIFO buffer 244, a receiver FIFO buffer 246, and two security FIFO buffers 242 and 248. However, the networking module 200 may implement any number of FIFO buffers and embodiments of the present invention are not limited in this respect. The arbiter 220 is responsible for determining which queue in the host processing unit 100 is to be serviced next contingent upon a priority scheme. For example, the arbiter 220 may always grant service to the highest priority queue first. The arbiter 220 may then grant service to lower priority queues when the higher priority queues are empty. In one embodiment, the transmitter queue 114 is specified with the highest priority among all queues in the host processing unit 100. However, this is merely an example of how the arbiter 220 may grant a queue service next and embodiments of the present invention are not limited in this respect.

Designed by the principle of the invention, the security engine 230 incorporates a cipher 232 to perform encryption and decryption while the software 110 assumes the rest of security work, such as encapsulation, decapsulation, and so forth. The present invention uses a security algorithm providing a cryptographic checksum to protect against forgery attacks. Cryptographic checksums are also referred to as message authentication codes (MACs), but they are instead called message integrity codes (MICs) in IEEE nomenclature. In one embodiment, the security engine 230 performs encryption and decryption both conforming to the IEEE standard 802.11i. Preferably, the security engine of the invention performs AES encryption and AES decryption using the cipher 232 in either a sequential or chain mode. AES is a symmetric key block cipher. A symmetric key cipher uses the same key for encryption and for decryption, and a block cipher operates on a byte string of a fixed size. The number of bits in the block is called the cipher's block size. AES uses a block size of 128 bits, which is 16 bytes. To reuse the hardware design, the security engine 230 provides four modes of operation including chain mode encryption, chain mode decryption, sequential mode encryption, and sequential mode decryption. This architecture also makes software more efficient since the data it passes to the security engine 230 is N times the block size rather than a single block at a time. To use either sequential or chain mode encryption, a message M subjected to preprocessing is fragmented into blocks $M_1 M_2 \ldots M_N$, although these blocks as a whole are passed to the security engine 230. The sequential mode encryption executed by the security engine 230 is described in the following pseudo-code:

$$\text{for } i=1 \text{ to N do } C_i \leftarrow E_K(M_i)$$

where $E_K(\bullet)$ denotes particular encryption under the key K using the block cipher 232. The resulting sequence of blocks $C_1 C_2 \ldots C_N$ is the encrypted message, where each block is simply the corresponding plaintext block encrypted under the key. The sequential mode decryption reverses this process:

$$\text{for } i=1 \text{ to } N \text{ do } M_i \leftarrow D_K(C_i)$$

where $D_K(\cdot)$ denotes decryption under the key K. From the aspect of software, matters are therefore reduced to $$C \leftarrow \overline{E}_K(M)$$

and $$M \leftarrow \overline{D}_K(C)$$

where $\overline{E}_K(\bullet)$ and $\overline{D}_K(\cdot)$ denote encryption and decryption invoking the sequential mode, respectively. As to the chain mode encryption, the behavior of the security engine 230 can be described as for a message $M=M_1 \ M_2 \ \ldots \ M_N$ $$C_1 \rightarrow E_K(M_1)$$

$$\text{for } i=2 \text{ to } N \text{ do } C_i \leftarrow E_K(M_i \oplus C_{i-1})$$

OUTPUT=$C_N$;

where $\oplus$ denotes the XOR operation and $C_N$ is the desired output. The chain mode decryption reverses this process:

for an encrypted message $C=C_1 \ C_2 \ldots C_N$ $$M_1 \leftarrow D_K(C_1)$$

$$\text{for } i=2 \text{ to } N \text{ do } M_i \leftarrow D_K(C_i \oplus M_{i-1})$$

RESULT=$M_N$;

where $M_N$ is the resulting output. From the aspect of software, matters are similarly reduced to for a message $M=M_1 \ M_2 \ \ldots \ M_N$ OUTPUT=$\tilde{E}_K(M)$ and for an encrypted message $C=C_1 \ C_2 \ \ldots \ C_N$ RESULT=$\tilde{D}_K(C)$ where $\tilde{E}_K(\bullet)$ and $\tilde{D}_K(\bullet)$ denote encryption and decryption invoking the chain mode, respectively. It should be appreciated by one skilled in the art that not only is AES utilized but other encryption algorithms like RC4 are contemplated for implementing the cipher 232 based upon the principles of the invention. Recently, the Standardization Administration of China has mandated a new WLAN standard that uses a different security protocol from IEEE 802.11. The Chinese standard uses a security protocol called WLAN Authentication and Privacy Infrastructure (WAPI). Hence, the security engine of the invention may further perform encryption and decryption both conforming to the WAPI specification.

With continued reference to FIG. 1, the software 110 initially partitions a data unit to be transmitted into N number of data sub-blocks each having the same block size as the cipher 232. Then the N data sub-blocks are put into the security queue 112. Throughout the description of the present invention, the term "data unit" shall be understood to include any grouping of one or more data elements of any size, including data cells, data bytes, and the like. In IEEE nomenclature, data units are denoted by "media access control service data units (MSDUs)" or "MAC protocol data units (MPDUs)". When the security queue 112 is granted service by the arbiter 220, the security engine 230 fetches the N data sub-blocks therefrom via the interface logic 210 and then generates a cryptographic checksum through the cipher 232 by performing encryption on the N data sub-blocks. The security engine 230 may execute in the sequential or chain mode contingent upon the actual mode of operation at that time. The security FIFO buffer 242 is configured to store the cryptographic checksum from the security engine 230. With the FIFO buffer 242 the cryptographic checksum is returned to the software 110 by which this checksum is appended to the N data sub-blocks. Thereafter, the software 110 stores the N data sub-blocks and the appended cryptographic checksum in the transmitter queue 114. When the transmit queue 114 is granted service by the arbiter 220, the security engine 230 fetches therefrom the N data sub-blocks along with the cryptographic checksum appended thereto and then generates a protected data unit through the cipher 232 by performing encryption on the N data sub-blocks including the appended cryptographic checksum. The protected data unit is next sent to the transmit FIFO buffer 244 configured to store data for transmission. Note that the networking module 200 also includes physical layer logic 250 to interface with a physical medium. Hence, the physical layer interface logic 250 accepts the protected data unit from the FIFO buffer 244 and transmits it over the physical medium. The decryption process is essentially the reverse of the encryption process described above. The receiver FIFO buffer 246 configured to store incoming data accepts N encrypted data sub-blocks along with an encrypted cryptographic checksum appended thereto through the physical layer interface logic 250. Of course, each of the data sub-blocks has the same block size as the cipher 232. When the receiver queue 116 is granted service by the arbiter 220, the security engine 230 fetches from the receiver FIFO buffer 246 the N encrypted data sub-blocks and the encrypted cryptographic checksum appended thereto. Thereafter, the security engine 230 recovers N received data sub-blocks including a received cryptographic checksum through the cipher 232 by performing decryption on the N encrypted data sub-blocks and the encrypted cryptographic checksum appended thereto. Then the N received data sub-blocks and the received cryptographic checksum are transferred to the receiver queue 116 via the interface logic 210. Further, the software 110 puts the N received data sub-blocks into the security queue 118. When the security queue 118 is granted service by the arbiter 220, the security engine 230 fetches the N received data sub-blocks therefrom and generates a recomputed result through the cipher 232 by performing encryption on the N received data sub-blocks. The recomputed result is next stored in the security FIFO buffer 248 so that it can be returned to the software 110 at a proper time. If the received cryptographic checksum and the recomputed result do not match each other, the software 110 discards the N received data sub-blocks in the receiver queue 116 to prevent potential forgery attacks.

Figure 2:
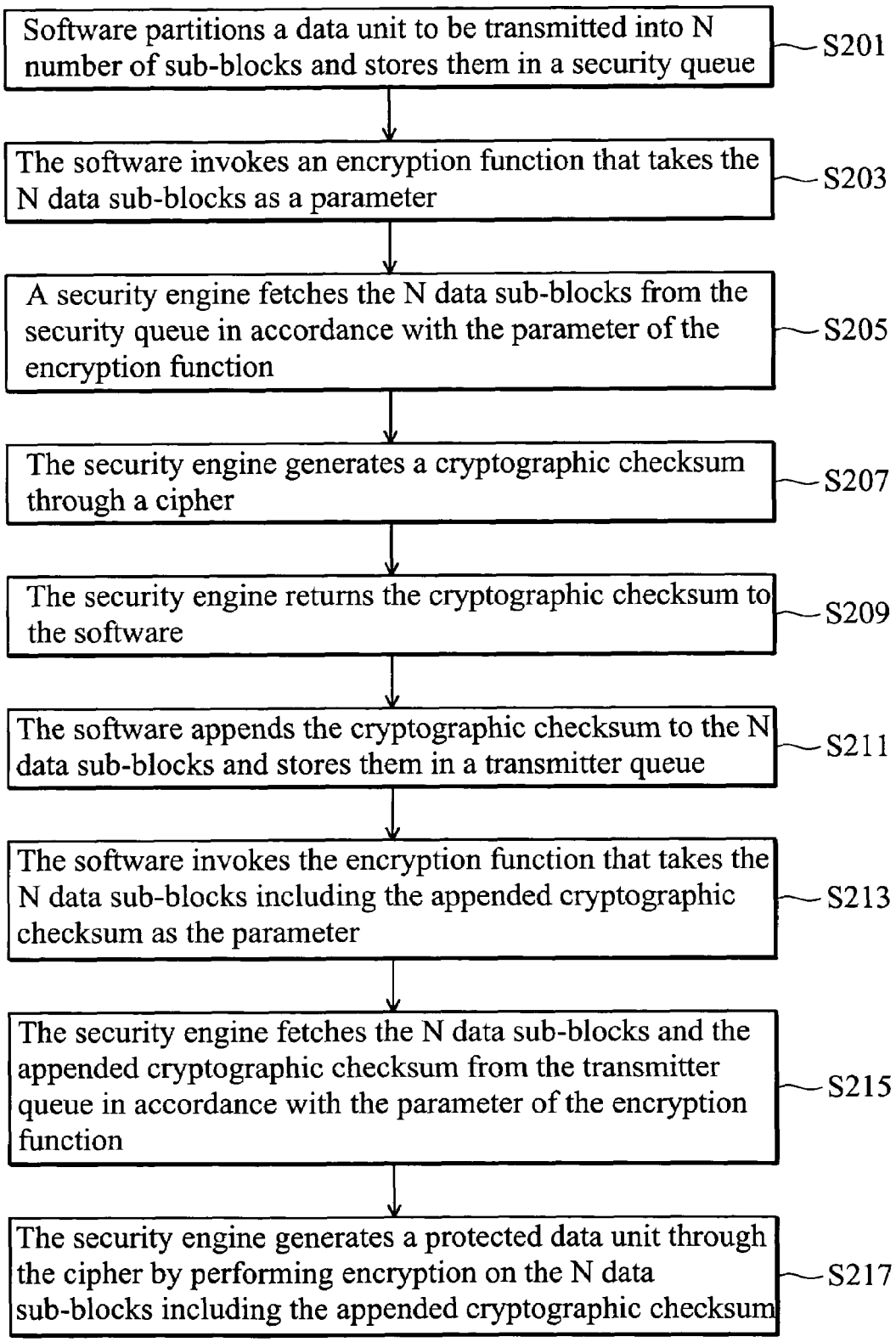
FIG. 2 is a flowchart illustrating primary steps used for encryption of data to be transmitted according to an embodiment of the invention.

With reference to FIG. 2, a flowchart of primary steps used for encryption of data to be transmitted is summarized. To begin with, in step S201, the software 110 partitions a data unit to be transmitted into N number of sub-blocks and stores them in the security queue 112. In step S203, the software 110 invokes an encryption function that takes the N data sub-blocks as a parameter. In response to the invoked encryption function, the security engine 230 proceeds to step S205 where it fetches the N data sub-blocks from the security queue 112 in accordance with the parameter of the encryption function. In step S207, the security engine 230 generates a cryptographic checksum through the cipher 232 by performing encryption on the N data sub-blocks. In step S209, the security engine 230 subsequently returns the cryptographic checksum to the software 110. The software 110 pursuant to step S211 appends the cryptographic checksum to the N data sub-blocks and stores them in the transmitter queue 114. In step S213, the software 110 invokes the encryption function that takes the N data sub-blocks including the appended cryptographic checksum as the parameter. In response to the invoked encryption function, the security engine 230 now proceeds to step S215 where it fetches the N data sub-blocks and the appended cryptographic checksum from the transmitter queue 114 in accordance with the parameter of the encryption function. Then in step S217 the security engine 230 generates a protected data unit through the cipher 232 by performing encryption on the N data sub-blocks including the appended cryptographic checksum. Consequently, the protected data unit is delivered for transmission on a physical medium. Note that a data unit must be fragmented into shorter segments containing N number of data sub-blocks if the data unit is so long that the encryption function cannot deal with it at one time. The process illustrated in FIG. 2 continues down the length of the data unit until the entire data unit has been encrypted. A padding scheme is required before application of the fragmentation to the data unit, provided that the data unit is not a multiple of N number of data sub-blocks.

Figure 3:
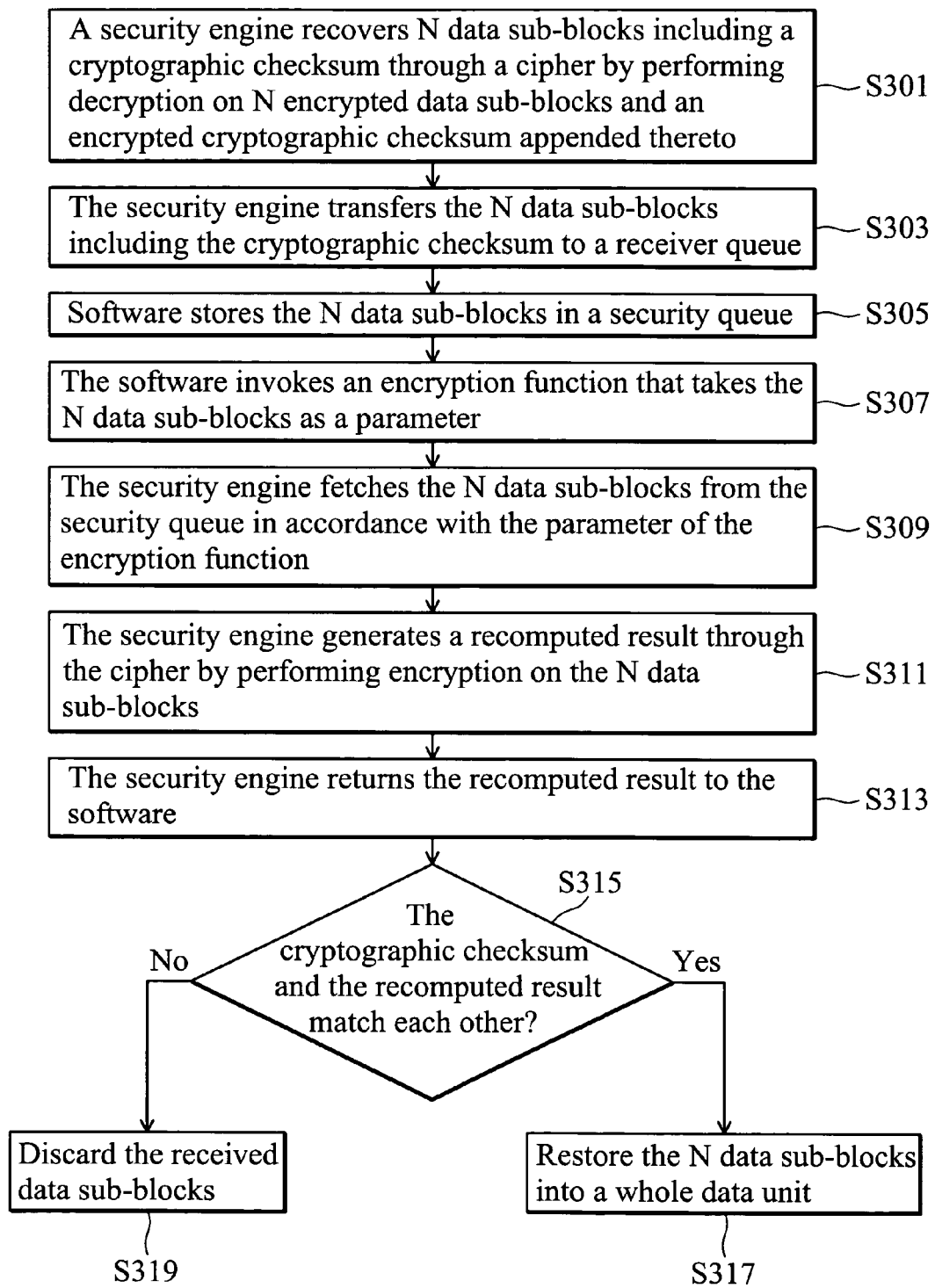
FIG. 3 is a flowchart illustrating primary steps used for decryption of received data according to an embodiment of the invention.

With reference to FIG. 3, a flowchart of primary steps used for decryption of received data is summarized. In response to receipt of N encrypted data sub-blocks and an encrypted cryptographic checksum appended thereto, the security engine 230 first proceeds to step S301 where it recovers N data sub-blocks including a cryptographic checksum through the cipher 232 by performing decryption on the N encrypted data sub-blocks and the encrypted cryptographic checksum appended thereto. In step S303, the N data sub-blocks including the cryptographic checksum are transferred to the receiver queue 116. Further, the software 110 pursuant to step S305 stores the N data sub-blocks in the security queue 118. In step S307, the software 110 invokes an encryption function that takes the N data sub-blocks as a parameter. In response to the invoked encryption function, the security engine 230 proceeds to step S309 where it fetches the N data sub-blocks from the security queue 118 in accordance with the parameter of the encryption function. In step S311, the security engine 230 generates a recomputed result through the cipher 232 by performing encryption on the N data sub-blocks. In step S313, the recomputed result is returned to the software 110. In step S315, the software 110 compares the cryptographic checksum with the recomputed result. If the cryptographic checksum matches the recomputed result, the software 110 pursuant to step S317 restores the N data sub-blocks into a whole data unit. Otherwise, the software 110 pursuant to step S319 discards these received data sub-blocks to protect against forgery attacks.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing secure communications in a wireless local area network, the network including at least a computer that comprises a host processing unit and a networking module incorporating a security engine, the method comprising:

software, hosted on the host processing unit, maintaining a transmitter queue and security queue;

the software partitioning a data unit to be transmitted into N number of sub-blocks, wherein each sub-block has the same block size as a cipher involved in the security engine;

the software storing the N data sub-blocks in the security queue;

the software invoking an encryption function that takes the N data sub-blocks as a parameter;

responsive to the invoked encryption function, the security engine fetching the N data sub-blocks from the security queue in accordance with the parameter of the encryption function;

the security engine generating a cryptographic checksum through the cipher by performing encryption on the N data sub-blocks;

the security engine returning the cryptographic checksum to the software;

the software appending the cryptographic checksum to the N data sub-blocks;

the software storing the N data sub-blocks and the appended cryptographic checksum in the transmitter queue;

the software invoking the encryption function that takes the N data sub-blocks including the appended cryptographic checksum as the parameter;

responsive to the invoked encryption function, the security engine fetching the N data sub-blocks and the appended cryptographic checksum from the transmitter queue in accordance with the parameter of the encryption function;

the security engine generating a protected data unit through the cipher by performing encryption on the N data sub-blocks including the appended cryptographic checksum; and the security engine delivering the protected data unit for transmission on a physical medium.

2. The method of claim 1 further comprising:
specifying the transmitter queue with a higher priority than that of the security queue.

3. The method of claim 2 wherein data of the lower priority security queue is not fetched for encryption unless no data of the higher priority transmitter queue is available.

4. The method of claim 1 wherein the security engine performs encryption conforming to the IEEE standard 802.11i.

5. The method of claim 4 wherein the security engine performs AES encryption using the cipher in a sequential mode.

6. The method of claim 4 wherein the security engine performs AES encryption using the cipher in a chain mode.

7. The method of claim 1 wherein the security engine performs encryption conforming to the WLAN Authentication and Privacy Infrastructure (WAPI) specification.

8. A method for performing secure communications in a wireless local area network, the network including at least a computer that comprises a host processing unit and a networking module incorporating a security engine, the method comprising:

software, hosted on the host processing unit, maintaining a receiver queue and security queue;

responsive to receipt of N encrypted data sub-blocks, each having the same block size as a cipher involved in the security engine, and an encrypted cryptographic checksum appended thereto, the security engine recovering N data sub-blocks including a cryptographic checksum through the cipher by performing decryption on the N encrypted data sub-blocks and the encrypted cryptographic checksum appended thereto;

the security engine transferring the N data sub-blocks including the cryptographic checksum to the receiver queue;

the software storing the N data sub-blocks in the security queue;

the software invoking an encryption function that takes the N data sub-blocks as a parameter;

responsive to the invoked encryption function, the security engine fetching the N data sub-blocks from the security queue in accordance with the parameter of the encryption function;

the security engine generating a recomputed result through the cipher by performing encryption on the N data sub-blocks;

the security engine returning the recomputed result to the software;

the software comparing the cryptographic checksum with the recomputed result; and if the cryptographic checksum matches the recomputed result, the software restoring the N data sub-blocks into a whole data unit.

9. The method of claim 8 wherein the security engine performs encryption and decryption both conforming to the IEEE standard 802.11i.

10. The method of claim 9 wherein the security engine performs AES encryption and AES decryption both using the cipher in a sequential mode.

11. The method of claim 9 wherein the security engine performs AES encryption and AES decryption both using the cipher in a chain mode.

12. The method of claim 8 wherein the security engine performs encryption and decryption both conforming to the WLAN Authentication and Privacy Infrastructure (WAPI) specification.

13. An apparatus for performing secure communications in a wireless local area network, comprising:

a host processing unit on which software is hosted, wherein the software maintains a transmitter queue and security queue; and a networking module adapted to communicate with the host processing unit via a peripheral bus, comprising:

an arbiter determining which queue is to be serviced next contingent upon a priority scheme;

a security engine having a cipher, when the security queue is granted service by the arbiter, the security engine fetching N data sub-blocks therefrom and then generating a cryptographic checksum through the cipher by performing encryption on the N data sub-blocks, when the transmit queue is granted service by the arbiter, the security engine fetching therefrom N data sub-blocks along with a cryptographic checksum appended thereto and then generating a protected data unit through the cipher by performing encryption on the N data sub-blocks including the appended cryptographic checksum;

a security FIFO buffer configured to store the cryptographic checksum, thus returning the cryptographic checksum to the software; and a transmit FIFO buffer configured to store the protected data unit for transmission;

wherein the software partitions a data unit to be transmitted into the N data sub-blocks, each of which has the same block size as the cipher of the security engine.

14. The apparatus of claim 13 wherein the software hosted on the host processing unit also maintains a receiver queue, and the networking module further comprises a receiver FIFO buffer associated with the receiver queue to accept and store N encrypted data sub-blocks, each having the same block size as the cipher, along with an encrypted cryptographic checksum appended thereto.

15. The apparatus of claim 14 wherein when the receiver queue is granted service by the arbiter, the security engine fetches from the receiver FIFO buffer the N encrypted data sub-blocks and the encrypted cryptographic checksum appended thereto, recovers N received data sub-blocks including a received cryptographic checksum through the cipher by performing decryption on the N encrypted data sub-blocks and the encrypted cryptographic checksum appended thereto, and transfers the N received data sub-blocks along with the received cryptographic checksum to the receiver queue.

16. The apparatus of claim 15 wherein the software hosted on the host processing unit puts the N received data sub-blocks in the security queue, and when the security queue is granted service by the arbiter, the security engine fetches the N received data sub-blocks therefrom, generates a recomputed result through the cipher by performing encryption on the N received data sub-blocks, and puts the recomputed result in the security FIFO buffer so that the recomputed result can be returned to the software.

17. The apparatus of claim 16 wherein the software hosted on the host processing unit discards the N received data sub-blocks in the receiver queue if the received cryptographic checksum and the recomputed result do not match each other.

18. The apparatus of claim 15 wherein the security engine performs encryption and decryption both conforming to the IEEE standard 802.11i.

19. The apparatus of claim 18 wherein the security engine performs AES encryption and AES decryption both using the cipher in a sequential mode.

20. The apparatus of claim 19 wherein the security engine performs AES encryption and AES decryption both using the cipher in a chain mode.

* * * * *